United States Patent Office 2,868,749
Patented Jan. 13, 1959

2,868,749

PAVING COMPOSITION CONTAINING SYNTHETIC RUBBERY POLYMER

James K. Hugg, Akron, Ohio, assignor to The Firestone Tire & Rubber Company, Akron, Ohio, a corporation of Ohio No Drawing. Application November 16, 1953
Serial No. 392,493

3 Claims. (Cl. 260—28.5)

This invention relates to paving and particularly to a new bituminous paving composition.

Bituminous paving materials as used herein includes native asphalt, artificial asphalt (such as that obtained as a residue from distillation of petroleum, coal tar and the like) and other bituminous paving materials such as gas house, coke oven, and water gas tars, pitches, road oils, pyrogenous asphalts, asphalt cutbacks and the like.

Bituminous paving compositions, for road construction, flooring and the like, are essentially composed of mixtures of a bituminous paving material having desired characteristics with suitable mineral aggregate such as sand, gravel and the like. The primary function of the bituminous material in such mixtures is that of an adhesive or binder for holding the aggregate together and preventing the percolation of water into and through the paving composition. Certain difficulties have for years accompanied the use of bituminous paving compositions. One of the prime such difficulties has resulted from the close dependence of the properties of bituminous materials upon the surrounding temperature. A bituminous paving material softens and flows at high temperatures and becomes hard and brittle at low temperatures. In either case, the capacity of the bituminous material to perform its primary function is affected adversely.

It has been proposed to reduce the temperature dependence of bituminous paving compositions by incorporating various rubbers therein. The rubbers heretofore proposed have been natural rubber and certain of the so-called synthetic rubbers. These rubbers have ordinarily been incorporated in solid crumb or powdered form into a molten bituminous paving material. However, it has been known to incorporate rubber in a bituminous paving material by mixing a rubber latex or aqueous rubber dispersion with an aqueous emulsion of a bituminous paving material and thereafter removing the water of the mixture in a suitable manner. This last method is not easily adapted to the production of high type road pavement. Rubbers of the above general types have been incorporated into bituminous paving materials in both vulcanized and unvulcanized states.

Rubber-containing bituminous paving compositions, heretofore produced, have tended to display improved properties of penetration, ductility and resistance to flow under varied temperatures. However, to the best of my knowledge, none of these compositions has exhibited any particular capacity to withstand flexing conditions. Resistance of a pavement to deterioration under flexing conditions, it is believed, is more indicative of the durability of the pavement under actual service than the other properties mentioned above. In view of the very heavy traffic which modern roads are required to withstand, a paving composition which will withstand flexing is most desirable.

It has been found, in accordance with the present invention that a certain class of synthetic rubbery polymers, if incorporated in latex form into a bituminous paving material, produce a bituminous paving composition which is affected only very slightly by wide variation of temperature and is particularly resistant to deterioration under flexing conditions.

The synthetic polymers found to produce paving compositions having the above desirable properties in accordance with the invention are synthetic rubbery polymers produced by aqueous emulsion polymerization of a conjugated diene with itself or with a vinyl aromatic compound. Suitable dienes are butadiene-1,3, isoprene, 2,3-dimethylbutadiene-1,3, piperylene, 2-chlorobutadiene-1,3, 2,3-dichlorobutadiene-1,3, 2-fluorobutadiene-1,3 and the like. Suitable vinyl aromatic compounds are styrene, vinyl toluene, vinyl naphthalene, and the nuclearly substituted styrenes such as the halostyrenes, alkyl styrenes and the like. Preferred polymers are those produced by aqueous emulsion polymerization of about 50 to 100 parts by weight of butadiene-1,3 and correspondingly about 50 to 0 parts by weight of styrene. The polymerization is carried out under conditions which are directed to obtaining a latex, the polymer of which has a relatively high Mooney value [1]. Preferably, the polymer exhibits very little branching of the polymer chain. Although paving compositions having desirable properties are obtained from latices containing a polymer having a Mooney value of as little as 50; the preferred latices for producing the desirable compositions of the invention are those containing a polymer having a Mooney value of at least about 70 and preferably about 100 or more. In order to obtain a polymer containing a relatively high Mooney value and a relatively low gel content, the polymerization should be carried out in the presence of a suitable amount of an appropriate modifier and the polymerization should be stopped prior to complete polymerization conversion by means of an adequate short-stopping agent. Suitable polymerization modifiers are well known in the art and include the various aliphatic mercaptans containing six or more carbon atoms per molecule. Suitable mercaptan modifiers can be of primary, secondary or tertiary configuration and can comprise a mixture or blend of several individual mercaptans. Suitable short-stopping agents are also well known in the art and include the various hydroquinones, dithiocarbamates, dinitrohalobenzenes and the like. In order to obtain a polymer which exhibits relatively little branching of the polymer chain in addition to having a high Mooney and a relatively low gel content, the polymerization is desirably conducted at a relatively low temperature, e. g., about 50° F. or lower. Low temperature polymerization is conveniently carried out, utilizing oxidation-reduction, or the so-called redox systems of activation involving the use of suitable oxidizing agents such as benzoyl peroxide cumene hydroperoxide, α,α-dimethylbenzyl hydroperoxide and the like along with suitable reducing agents such as a sugar, acetoacetic ester, dihydroxy acetone and the like and a metal salt activator. In the category of low temperature polymer latices, I include as suitable, oil-extended low temperature polymer latices. Although polymer latices obtained by low temperature polymerization are preferred, polymer latices obtained by the more widely used high temperature (100° F. or higher) polymerizations are suitable as long as the polymers of the high temperature latices have the characteristics of Mooney value and gen-

---
[1] ML/4/212° F.

eral configuration referred to above. Suitable high temperature polymer latices are produced for example by the use as an activator of a p-nitrophenyl diazonium salt such as p-nitrobenzene diazonium p-chlorobenzene sulfonate.

As an illustration of the preparation of a latex suitable for practicing the invention, the following ingredients are charged into a polymerization reactor:

| | Parts by weight |
|---|---|
| Butadiene | 70.0. |
| Styrene | 30.0. |
| Potassium oleate | 1.25. |
| Tamol N [1] | 1.5. |
| Diisopropylbenzene hydroperoxide | 0.22. |
| Ferrous sulfate heptahydrate | 0.10. |
| Potassium pyrophosphate | 0.25. |
| Sodium sulfhydrate | 0.05. |
| Potassium chloride | 0.8. |
| Tertiary mercaptans | As required to give approximately 100 Mooney. |
| Water | 60.0. |

[1] The salt of the condensation product of a naphthalene sulfonic acid with formaldehyde supplied by Rohm & Haas Co.

The following incremental charges are injected into the reactor at the indicated polymerization conversions:

| | Parts by weight/ 100 parts monomer |
|---|---|
| 1st increment @ 20% conversion: | |
| Sodium sulfhydrate | 0.02 |
| Diisopropylbenzene hydroperoxide | 0.08 |
| Water | 2.60 |
| 2nd increment @ 30% conversion: | |
| Ferrous sulfate heptahydrate | 0.03 |
| Potassium pyrophosphate | 0.05 |
| Diisopropylbenzene hydroperoxide | 0.08 |
| Water | 2.80 |
| 3rd and 4th increment @ 45% and 60% conversion: | |
| Potassium oleate | 0.875 |
| Water | 4.000 |

Polymerization of the above materials is carried out at 50° F. At approximately 60 percent polymerization conversion the polymerization is stopped by a suitable shortstop agent, e. g., sodium dimethyl dithiocarbamate. The reaction mixture is stripped of unreacted monomer and the resulting latex has a solids content of from 47 to 50 percent and a pH of about 9.5 to 10.5.

In preparing the compositions of the invention, it is important that the polymer be used in latex form. Preferably, the latex is neither vulcanized nor does it contain vulcanizing agents. The latex is used in an amount sufficient to result in a mixture wherein the polymer amounts to approximately 2 to 15% by weight based on the weight of bituminous material. The bituminous material of a desired penetration (ordinarily about 60 to 100) is used in any desired amount but will usually constitute about 5 to 10 percent by weight of the total paving mixture. The mineral aggregate of a desired grade constitutes the balance of the paving composition.

One method of producing paving compositions in accordance with the invention involves mixing a desired amount of a synthetic rubbery polymer latex, of the type described above, with a desired amount of molten bituminous material at a temperature below the boiling point of water, elevating the temperature of the resulting mixture sufficiently to remove the water therefrom, and mixing the mixture with mineral aggregate to produce a paving composition. This method, though effective for producing paving compositions in accordance with the invention, is somewhat slow and involves certain handling difficulties in present commercial paving plants. This method is presently, therefore, better adapted to relatively small scale operations.

A more preferred method of producing paving compositions in accordance with the invention involves the following. Bituminous paving material is heated to a temperature sufficient to maintain it in a molten state and the molten bituminous material is thoroughly mixed in any suitable apparatus, e. g., a pug mill or the like, with a desired quantity of preheated aggregate. The aggregate is ordinarily preheated to a temperature of from about 300 to 400° F. or higher and the molten bituminous material, prior to mixing with the aggregate, ordinarily has a temperature of at least about 250° F. In any event the bituminous paving material aggregate mixing is effected at a temperature substantially above the boiling point of water. One of the previously described synthetic polymer latices is then added with continued mixing to the hot bituminous paving material-aggregate mixture. The water-content of the latex is almost immediately flashed off when the latex is introduced into the bituminous material-aggregate mixture and the polymer content of the latex is almost immediately (often in the neighborhood of 30 to 40 seconds) homogeneously blended with the bituminous material. The resulting mixture is now suitable for use as a paving composition and can be so used in any suitable manner well known to the paving industry. The temperature of the final mix will ordinarily be about 300° F. but can be as hot as 400° F. or hotter. It is important in following this method that the bituminous paving material and aggregate are first mixed together before addition of the latex. If the latex is first added to the very hot molten bituminous material, violent foaming occurs. If the latex is first added to the hot aggregate, the polymer of the latex deposits as a film on and around the particles of the aggregate and will not homogeneously mix with the bituminous material.

The outstanding properties of a paving composition in accordance with the invention are best shown by tests involving the flexing of samples of various asphaltic paving compositions not in accordance with the invention and tests involving the flexing of samples of a paving composition in accordance with the invention. The first group of tests which follow hereafter all involve paving compositions not in accordance with the invention, i. e., paving compositions containing various rubbers which have been incorporated in solid as distinguished from latex form into asphalt. All of these compositions were prepared by mixing together molten asphalt, aggregate (crushed stone) and a solid rubber to be designated hereafter. The asphalt content in each instance was 8.5% by weight of the total paving mixture and the rubber content in each instance was 7.5% by weight of the asphalt content. All of these paving compositions were prepared by first mixing the rubber with aggregate and then adding molten asphalt to the rubber-aggregate mixture with continued mixing.

One of these paving compositions contained no rubber and was maintained as a control (composition A). Another of these paving compositions (composition B) contained powdered vulcanized natural rubber. Another of these paving compositions (composition C) contained vulcanized powdered GR–S (a rubbery copolymer of butadiene-1,3 and styrene) rubber. Test specimens were prepared from the above paving compositions by pouring 1410 gram portions of each of the paving compositions, while still in the molten state, into a mold having inside dimensions of 2" x 1½" x 14". The specimens were in each case then compacted by a hydraulic compression machine under a load of 6,000 lbs. applied at the rate of 4,000 lbs. per minute. The load was maintained 1½ minutes and then released at the rate of 6,000 lbs. per minute; each test specimen was allowed to cool to room temperature and then removed from the mold. Eight test specimens of this type were prepared from each of the above paving compositions. Four of each of the 8 specimens of each paving composition were subjected to the hereafter described flexing test without further treatment. The results of the testing of these four specimens appear in Table I under "Non-aged." In order to determine the effect of aging, the remaining four specimens of each of the paving compositions were subjected to accelerated aging conditions in a forced draft oven at 212° F. for a period of 330 hours; these specimens were then subjected to the flexing test. The flexing tests were carried out on an apparatus which provided holding means at each end of a specimen to retain the ends of the specimen in essentially a stationary position. The apparatus provided means for flexing the center portion of the specimen in a reciprocating manner a controlled distance in a vertical direction at a constant rate. In the tests reported hereafter, the apparatus was adjusted to flex the center of specimens through vertical distances of 1/8" or 1/3" or 1/2". The rate of flexing was in each test 25 cycles per minute. The test apparatus was designed to enable flexing the specimens at any desired temperature. Flexing tests were conducted at two different temperatures, i. e., 75° F. and 40° F. Two of the unaged specimens of each paving composition were given 2 stages of flexing at 75° F. In the first stage of this flexing test (500 cycles) the specimens were vertically deflected 1/8" at the center. The second stage of this flexing test involved deflecting the specimens 1/3" at the center. The other two unaged specimens were subjected to the same two stages of flexing except that they were maintained at a temperature of 40° F. during the test. Aged specimens were subjected to the above test procedure at 75° F. All of the aged specimens broke before the 500 deflections at 1/8" had been completed. The results of these tests, which are set out in Table I below, represent averages of the results obtained for two equivalent specimens.

TABLE I

| Paving Composition | Number of Flexings | | | |
|---|---|---|---|---|
| | @ 75° F. | | @ 40° F. | |
| | Stage 1, 1/8" | Stage 2, 1/3" | Stage 1, 1/8" | Stage 2, 1/3" |
| Non-aged: | | | | |
| A (Control) | 500 | 385 | 500 | 21 |
| B | 500 | 60 | 500 | 5 |
| C | 500 | 164 | 500 | 10 |
| Aged: | | | | |
| A (Control) | 330 | | | |
| B | 119 | | | |
| C | 193 | | | |

Referring to the above data, it is seen that all of the paving compositions containing asphalt and various rubbers not in accordance with the invention were not as satisfactory under the flexing test conditions as a control paving composition containing asphalt but no rubber whatsoever.

*Example 1*

A paving composition in accordance with the invention was prepared according to the first described method of producing paving compositions in accordance with the invention. Asphalt (penetration of 85–100) was heated to 200° F. The previous described illustrative synthetic polymer latex in an amount sufficient to constitute 5% by weight rubbery polymer on the weight of asphalt, was added with continued mixing to the warm asphalt. The temperature of the asphalt-latex mixture was elevated to and maintained at 212° F. until all of the water was removed from the mixture. Eight and five tenths parts by weight of the resulting polymer-asphalt mixture was heated to 350° F. and mixed with 91.5 parts by weight of a mineral aggregate to produce a paving composition in accordance with the invention. Test specimens of this paving composition (composition D) were made according to the same procedure outlined for preparing specimens from the previous paving compositions. Another paving composition (hereafter designated control) was prepared which differed from composition D only in that it contained no polymer. Test specimens of the control were also prepared according to the previously described procedure. One group of specimens from each paving composition was not subjected to aging conditions. Other specimens from each paving composition were subjected to aging in a forced air oven at 212° F. for the periods of time indicated below in Table II. Tests of the specimens were carried out at 85° F. according to the procedure and on the apparatus previously described. The results of these tests apepar in Table II as follows:

TABLE II

| Paving Composition | Hours of Aging | Number of Flexings @ 85° F. | | |
|---|---|---|---|---|
| | | Stage 1, 1/8" | Stage 2, 1/3" | Stage 3, 1/2" |
| Control | 0 | 500 | 500 | 115 |
| D | 0 | 500 | 500 | 458 |
| Control | 24 | 500 | 381 | |
| D | 24 | 500 | 500 | 93 |
| Control | 48 | 500 | 227 | |
| D | 48 | 500 | 500 | 7 |
| Control | 72 | 500 | 74 | |
| D | 72 | 500 | 258 | |
| Control | 96 | 500 | 8 | |
| D | 96 | 500 | 63 | |

Referring to the data of Table II, it is seen that in every instance, the paving compositions in accordance with the invention (composition D) showed outstandingly better resistance to deterioration under flexing conditions than a control asphaltic paving composition differing only from composition D in that it did not contain a polymer. Without aging, specimens from both the control and composition D withstood 500 cycles of flexing 1/8" and 500 cycles of flexing 1/3". In the 3rd stage of the test (flexed 1/2"), however, the unaged control specimens broke after 115 cycles whereas the unaged specimens of composition D withstood 458 cycles. Similarly, after aging, the specimens of a paving composition in accordance with the invention were in every instance considerably superior to the control.

*Example 2*

A paving composition was prepared according to the preferred second described method of producing paving compositions in accordance with the invention. Mineral aggregate, preheated to 420° F., was introduced into a pug mill. Asphalt (70 to 80 penetration) was heated to about 250° F. and thoroughly mixed in the pug mill with the aggregate. The same type synthetic polymer latex used in Example 1 was then introduced into the pug mill and mixed with the hot asphalt-aggregate mixture. The latex was used in an amount sufficient to result in a polymer-asphalt-aggregate mixture wherein the polymer amounted to 5% by weight based on the weight of asphalt. The asphalt was used in an amount sufficient to constitute 6.5% by weight of the total paving mixture including aggregate. The water-content of the latex almost immediately flashed off and the polymer content of the latex almost immediately (in the neighborhood of 30 to 40 seconds) homogeneously blended with the asphalt-aggregate mixture to produce a paving composition in accordance with the invention (hereafter designated composition E). Another paving composition (hereafter designated control) was prepared by mixing asphalt and aggregate in the same proportions and at the same temperatures used in preparing composition E; the control differed from composition E only in that it contained no polymer. Test specimens were prepared and tested in the general manner previously described.

None of the specimens were aged. The results of these tests are set out in Table III as follows:

TABLE III

| Paving Composition | Number of Flexings @ 75° F. | | |
|---|---|---|---|
| | Stage 1, 1/8" | Stage 2, 1/4" | Stage 3, 1/2" |
| Control | 500 | 15 | |
| E | 500 | 500 | 5 |

Referring to the data of Table III, it is again seen that a paving composition in accordance with the invention has outstanding resistance to deterioration under flexing conditions. The control failed after only 15 flexings in the second stage of the test whereas composition E withstood all 500 flexings of stage 2 and some of stage 3.

To further point out the merits of paving compositions in accordance with the invention as distinguished from other possible paving compositions, a paving composition (composition F), not in accordance with the invention, was prepared by using a natural rubber latex, in lieu of a synthetic rubber latex of the type with which the present invention is concerned, in the method described above in Example 1. Here too, the rubber (natural rubber) content of the final asphaltic paving composition was 5% by weight based on the weight of asphalt and the combined asphalt-rubber content amounted to 8.5 percent of the weight of the final total mix. Another paving composition was prepared as a control which differed only from composition F in that it contained no rubber. Specimens for testing these two paving compositions were prepared and tested in the manner previously described. The results of these tests are set out in Table IV as follows:

TABLE IV

| Paving Composition | Hours of Aging | Number of Flexings @ 75° F. | | |
|---|---|---|---|---|
| | | Stage 1, 1/8" | Stage 2, 1/4" | Stage 3, 1/2" |
| Control | 0 | 500 | 378 | |
| F | 0 | 500 | 273 | |
| Control | 24 | 500 | 17 | |
| F | 24 | 184 | | |
| Control | 48 | 500 | 89 | |
| F | 48 | 101 | | |
| Control | 72 | 500 | 113 | |
| F | 72 | 95 | | |
| Control | 96 | 500 | 42 | |
| F | 96 | 64 | | |
| Control | 120 | 500 | 39 | |
| F | 120 | 38 | | |

Referring to the data of Table IV, it is apparent that a natural rubber latex, used in one of the procedures which is so effective in producing outstandingly desirable paving compositions in accordance with the invention, produces a paving composition which is not as durable under flexing conditions as a control asphaltic paving composition containing no rubber whatsoever.

The data shown in the preceding tests, when considered together, forcefully demonstrate that previously known and certain other rubber-containing asphaltic paving compositions are not as resistant, in either an aged or unaged condition, to deterioration as a result of flexing as asphaltic paving compositions containing no rubber. The specially prepared asphaltic paving compositions of the invention, containing particular synthetic rubbery polymers, on the other hand, exhibit outstanding resistance to deterioration under flexing conditions.

What is claimed:

1. A bituminous paving composition comprising a bituminous paving material mineral aggregate and a synthetic rubbery copolymer of a conjugated diene and a vinyl aromatic compound, said copolymer having a Mooney value of at least 50 and said paving composition being produced by (A) mixing molten bituminous paving material and mineral aggregate at a temperature substantially above the boiling point of water and (B) adding a latex of said copolymer to the hot bituminous paving material-aggregate mixture with continued mixing and heating, whereby the water content of said latex is essentially immediately flashed off and the copolymer is essentially immediately homogeneously combined with said mixture to provide a paving composition which is particularly durable under flexing conditions.

2. A bituminous paving composition comprising a bituminous paving material, mineral aggregate and a synthetic rubbery copolymer of butadiene-1,3 and styrene, said copolymer having a Mooney value of at least 50 and said paving composition being produced by (A) mixing molten a bituminous paving material and mineral aggregate at a temperature of at least about 250° F. and (B) adding a latex of said copolymer to the hot bituminous paving material-aggregate mixture with continued mixing and heating, whereby the water content of said latex is essentially immediately flashed off and the copolymer is essentially immediately homogeneously combined with said mixture to provide a particularly durable paving composition.

3. A bituminous paving composition comprising a bituminous paving material, mineral aggregate and a synthetic rubbery copolymer of butadiene-1,3 and styrene, said copolymer having a Mooney value of at least about 100 and said paving composition being produced by (A) mixing molten bituminous paving material and mineral aggregate at a temperature of at least about 250° F. and (B) incorporating a latex of said copolymer into the hot bituminous paving material-aggregate mixture to provide a paving composition which is particularly durable under flexing conditions.

References Cited in the file of this patent

UNITED STATES PATENTS

| 2,087,614 | Burgin | July 20, 1937 |
| 2,454,506 | Fischer | Nov. 23, 1948 |
| 2,509,777 | McMillan et al. | May 20, 1950 |
| 2,686,166 | Taylor | Aug. 10, 1954 |

OTHER REFERENCES

Rubber Age—article by Clinebell et al., vol. 70, No. 1, pages 67–73, October 1951.